US012666170B2

(12) United States Patent
Hirano et al.

(10) Patent No.: US 12,666,170 B2

(45) Date of Patent: Jun. 23, 2026

(54) IMAGE CAPTURING APPARATUS AND METHOD USING MULTI-STAGE AMPLIFICATION WITH DIFFERENT GAINS ACCORDING TO SHOOTING MODE

(71) Applicant: CANON KABUSHIKI KAISHA, Tokyo (JP)

(72) Inventors: Hiroshi Hirano, Kanagawa (JP); Kosuke Matsubara, Tokyo (JP); Toshiharu Ueda, Tokyo (JP); Shohei Tozawa, Kanagawa (JP); Kazuto Jikei, Tokyo (JP); Fumihito Karahashi, Kanagawa (JP); Daisuke Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 294 days.

(21) Appl. No.: 18/498,365

(22) Filed: Oct. 31, 2023

(65) Prior Publication Data

US 2024/0155229 A1 May 9, 2024

(30) Foreign Application Priority Data

Nov. 8, 2022 (JP) ................................ 2022-179092

(51) Int. Cl.

*H04N 25/51* (2023.01)
*H04N 23/667* (2023.01)
(Continued)

(52) U.S. Cl.

CPC ........... *H04N 25/51* (2023.01); *H04N 23/667* (2023.01); *H04N 23/683* (2023.01); *H04N 25/57* (2023.01); *H04N 25/77* (2023.01)

(58) Field of Classification Search

CPC ........ H04N 25/51; H04N 25/57; H04N 25/77; H04N 25/78; H04N 25/59; H04N 23/667;
(Continued)

(56) References Cited

U.S. PATENT DOCUMENTS

| | | | | |
|---|---|---|---|---|
| 11,671,714 B1 * | 6/2023 | Xiao | G06T 7/246 | 348/362 |
| 2023/0164456 A1 * | 5/2023 | Jun | H04N 25/616 | 348/207.99 |

FOREIGN PATENT DOCUMENTS

| | | |
|---|---|---|
| JP | 2015-128253 A | 7/2015 |
| JP | 2019-022173 A | 2/2019 |
| JP | 2021-022921 A | 2/2021 |

* cited by examiner

*Primary Examiner* — Nicholas G Giles

(74) *Attorney, Agent, or Firm* — Cowan, Liebowitz & Latman, P.C.

(57) ABSTRACT

An image capturing apparatus includes a plurality of pixels, a first amplifier capable of amplifying a signal of each pixel using a plurality of different gains, a second amplifier capable of amplifying the signal of each pixel using a plurality of different gains, with a method different from a method used by the first amplifier; and a control unit that performs control so as to execute one of first processing and second processing based on a shooting mode of the image capturing apparatus, a setting at the time of shooting, or a state of a subject, the first processing causing the first amplifier to amplify the signal of each pixel using a plurality of different gains, the second processing causing the second amplifier to amplify the signal of each pixel using a plurality of different gains.

15 Claims, 6 Drawing Sheets

(51) Int. Cl.

| | |
|---|---|
| ***H04N 23/68*** | (2023.01) |
| ***H04N 25/57*** | (2023.01) |
| ***H04N 25/77*** | (2023.01) |

(58) Field of Classification Search

CPC . H04N 23/683; H04N 23/6811; H04N 23/741

See application file for complete search history.

F I G. 5
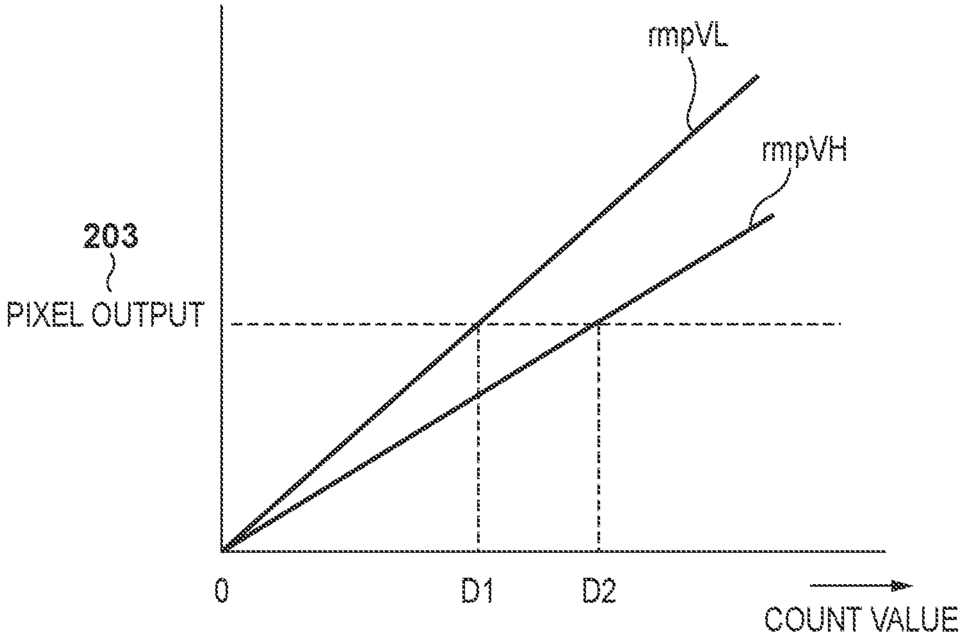

AMPLIFIER SETTING
DETERMINATION PROCESS

S301

METERING

S302

MOTION
VECTOR THRESHOLD Thv
OR MORE?

YES

NO

S304

LUMINANCE
DIFFERENCE THRESHOLD Thd
OR MORE?

YES

NO

S305

PIXEL GAIN: 2 GAIN
RAMP GAIN: 1 GAIN

S303

PIXEL GAIN: 1 GAIN
RAMP GAIN: 2 GAIN

S306

PIXEL GAIN: 2 GAIN
RAMP GAIN: 2 GAIN

RETURN

IMAGE CAPTURING APPARATUS AND METHOD USING MULTI-STAGE AMPLIFICATION WITH DIFFERENT GAINS ACCORDING TO SHOOTING MODE

BACKGROUND OF THE INVENTION

Field of the Invention

The present invention relates to an image capturing apparatus and a method for controlling the same.

Description of the Related Art

Conventionally, a technique has been proposed that enhances a dynamic range in connection with tones with use of an image sensor used in a general digital camera, such as a CMOS image sensor.

For example, Japanese Patent Laid-Open No. 2015-128253 discloses a technique whereby a dynamic range is enhanced by simultaneously processing a signal of each pixel among a plurality of pixels under different gains using a plurality of column circuits.

Furthermore, Japanese Patent Laid-Open No. 2021-022921 discloses a technique whereby, with provision of an FD unit that converts charges of signals transferred from a photoelectric conversion unit into a voltage and an FD expansion unit that functions as an expanded capacity of the FD unit, a signal of each pixel among the plurality of pixels is simultaneously processed under different gains by switching between ON and OFF of the FD expansion unit.

Meanwhile, these techniques have different characteristics depending on an implementation method. In general, a circuit configuration of an image sensor allows a gain to be applied to pixel signals inside pixels or in a column circuit before AD conversion.

If a gain is applied in a circuit in a stage that follows an image sensor, S/N tends to get worse as noise components generated in a circuit unit in a stage that precedes the image sensor are also amplified. On the other hand, pixel signals can be read out in a short period of time, which is advantageous in terms of a frame rate.

Meanwhile, a method that applies a gain in a circuit in a stage that precedes an image sensor yields better S/N and is advantageous in terms of noise, but takes time in reading out pixel signals.

Therefore, there is a trade-off relationship between the image quality and the frame rate.

SUMMARY OF THE INVENTION

The present invention has been made in view of the aforementioned problem, and provides an image capturing apparatus that achieves a balance between the image quality and the frame rate.

According a first aspect of the present invention, there is provided an image capturing apparatus, comprising: a plurality of pixels that generate signals through photoelectric conversion; a first amplifier capable of amplifying a signal of each pixel among the plurality of pixels using a plurality of different gains; a second amplifier capable of amplifying the signal of each pixel among the plurality of pixels using a plurality of different gains, with a method different from a method used by the first amplifier; and at least one processor or circuit configured to function as a control unit that performs control so as to execute one of first processing and second processing based on a shooting mode of the image capturing apparatus, a setting at the time of shooting, or a state of a subject, the first processing causing the first amplifier to amplify the signal of each pixel among the plurality of pixels using a plurality of different gains, the second processing causing the second amplifier to amplify the signal of each pixel among the plurality of pixels using a plurality of different gains.

According to a second aspect of the present invention, there is provided a method for controlling an image capturing apparatus including a plurality of pixels that generate signals through photoelectric conversion, a first amplifier capable of amplifying a signal of each pixel among the plurality of pixels using a plurality of different gains, and a second amplifier capable of amplifying the signal of each pixel among the plurality of pixels using a plurality of different gains, with a method different from a method used by the first amplifier, the method comprising: performing control so as to execute one of first processing and second processing based on a shooting mode of the image capturing apparatus, a setting at the time of shooting, or a state of a subject, the first processing being capable of causing the first amplifier to amplify the signal of each pixel among the plurality of pixels using a plurality of different gains, the second processing causing the second amplifier to amplify the signal of each pixel among the plurality of pixels using a plurality of different gains.

Further features of the present invention will become apparent from the following description of exemplary embodiments with reference to the attached drawings.

BRIEF DESCRIPTION OF THE DRAWINGS

FIG. 5 is a diagram showing waveforms of ramp signals input to AD converters.

DESCRIPTION OF THE EMBODIMENTS

Figure 1:
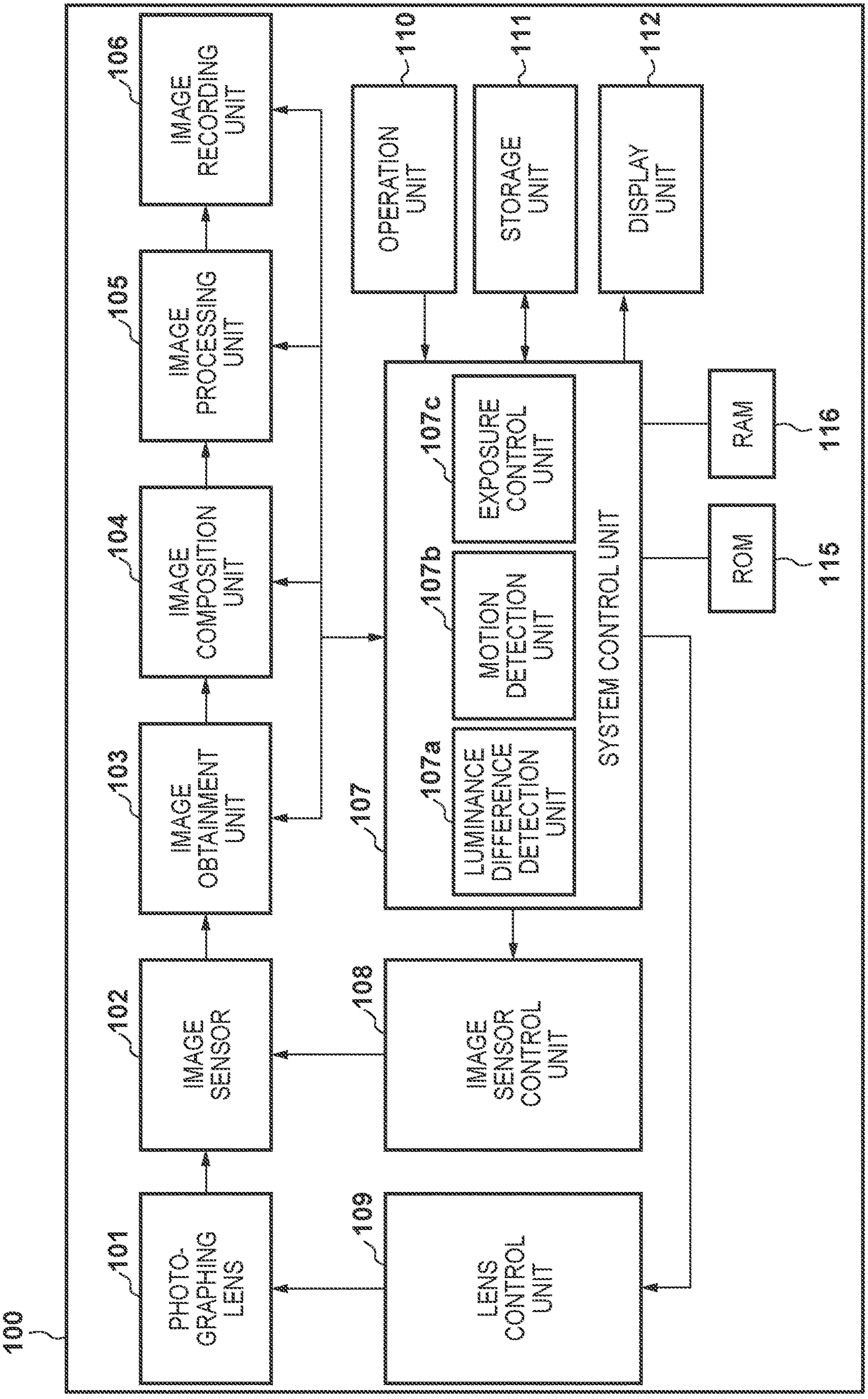
FIG. 1 is a block diagram showing a schematic configuration of an image capturing apparatus according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A first embodiment of the present invention will be described with reference to FIG. 1 to FIG. 5.

An image capturing apparatus 100 according to the first embodiment includes pixel gain units that apply a gain to one pixel signal using a floating diffusion (hereinafter, FD)

that performs charge-voltage conversion inside a pixel, and ramp gain units that apply a gain in a ramp circuit outside pixels.

With the pixel gain units and the ramp gain units, a signal of each pixel among a plurality of pixels pixel can be amplified under two types of gains, namely a Hi gain (high amplification factor) and a Lo gain (low amplification factor), and the amplified signal can be read out. Furthermore, the signal can also be amplified under one type of gain and read out.

The image capturing apparatus 100 according to the first embodiment can apply a gain to a pixel signal using a method that is optimum for shooting conditions by switching between the two types of amplifiers, namely the pixel gain units and the ramp gain units, in accordance with a shooting mode at the time of shooting of the image capturing apparatus, settings at the time of shooting, or a state of a subject.

<Description of Configuration>

FIG. 1 is a block diagram showing a schematic configuration of the image capturing apparatus 100 in the first embodiment.

In FIG. 1, a photographing lens 101 is an interchangeable lens unit that is attachable to a main body of the image capturing apparatus 100, or a lens component built in the main body, and is composed of a group of a plurality of lenses such as a focus lens and a zoom lens, a diaphragm mechanism, and the like.

An image sensor 102 is a CMOS image sensor that includes a plurality of pixels, and generates charges corresponding to the amount of incident light by performing photoelectric conversion in each pixel with respect to an optical image of a subject formed by the photographing lens 101. Then, it amplifies pixel signals corresponding to the generated charges under a predetermined gain, and outputs the amplified signals as an image signal. At this time, by outputting image signals that have been amplified under a plurality of different gains, image signals of a plurality of different signal levels can be obtained in a single image capture session.

Furthermore, the image capturing apparatus 100 of the present embodiment includes a plurality of methods for amplifying pixel signals in the image sensor 102, and can switch between the methods for amplifying pixel signals in accordance with a shooting mode at the time of shooting performed by the image capturing apparatus 100 or settings at the time of shooting. Note that a specific switching method will be described later in detail.

An image obtainment unit 103 obtains image signals output from the image sensor 102, temporarily holds the obtained image signals, and also performs metering using the obtained image signals.

An image composition unit 104 generates a high dynamic range (HDR) image using any composition method based on output signals from the image sensor 102, which are temporarily held in the image obtainment unit 103. For example, there is a method that performs composition using an image signal that has been amplified under the Hi gain with respect to an image portion of a predetermined signal level or lower, and using an image signal that has been amplified using the Lo gain with respect to an image portion in which a signal level exceeds the predetermined signal level, and which is bright and shows blown-out highlights.

Note that in a normal image used as a signal of a dark portion in a composite image, it is desirable that random noise in the dark portion be suppressed. Note that in a case where HDR shooting is not performed, the image signals held in the image obtainment unit 103 are output as is.

An image processing unit 105 executes various types of signal processing such as gamma processing, color signal processing, and exposure correction processing with respect to image signals output from the image composition unit 104, and outputs the processed image signals.

An image recording unit 106 records the image signals processed by the image processing unit 105 into a storage apparatus or a storage medium. For example, a memory device that is attachable to the main body of the image capturing apparatus 100 is used as the storage apparatus or the storage medium.

A system control unit 107 includes a luminance difference detection unit 107*a*, a motion detection unit 107*b*, an exposure control unit 107*c*, and the like, and controls an image sensor control unit 108 and a lens control unit 109 based on, for example, image signals held in the image obtainment unit 103 and the result of metering. Furthermore, the system control unit 107 controls the entire image capturing apparatus 100 by deploying a program stored in a ROM 115 to a RAM 116 and executing the program. Note that the luminance difference detection unit 107*a*, the motion detection unit 107*b*, and the exposure control unit 107*c* may be independent circuits, or may be realized by the system control unit 107 executing the program stored in the ROM 115.

The luminance difference detection unit 107*a* calculates a luminance difference between a bright portion and a dark portion using the image signals held in the image obtainment unit 103. For example, an entire screen is divided into a plurality of areas, luminance (brightness) is measured on a per-area basis, and a luminance difference between a bright area (bright portion area) and a dark area (dark portion area) is calculated.

The motion detection unit 107*b* executes processing for detecting an amount of motion of a subject from the image signals of a current frame and the image signals of a previous frame, which are held in the image obtainment unit 103.

The exposure control unit 107*c* calculates an exposure condition to be used in image shooting based on the result of metering performed by the image obtainment unit 103.

The image sensor control unit 108 controls driving of the image sensor 102 in accordance with a control signal from the system control unit 107. Also, the lens control unit 109 controls driving of the photographing lens 101 in accordance with a control signal from the system control unit 107.

A user can input an instruction to the image capturing apparatus 100 by operating an operation unit 110. The operation unit 110 includes, for example, operation members such as a release button, a mode switching dial, and a zoom operation lever, and a touch panel, among others. The system control unit 107 is notified of an instruction that has been input by the user via the operation unit 110.

A storage unit 111 is a storage unit that stores the content of an instruction that has been input by the user to the image capturing apparatus 100, and is, for example, an electrically erasable and recordable nonvolatile memory. A display unit 112 is a display apparatus for displaying shot images, information at the time of shooting, a user interface for an operation performed via the operation unit 110, and the like, and is composed of, for example, a TFT-LCD and the like.

<Characteristics of Amplifiers and Switching Method>

Next, the image sensor 102 arranged in the image capturing apparatus 100 will be described with reference to FIG.

Figure 2:
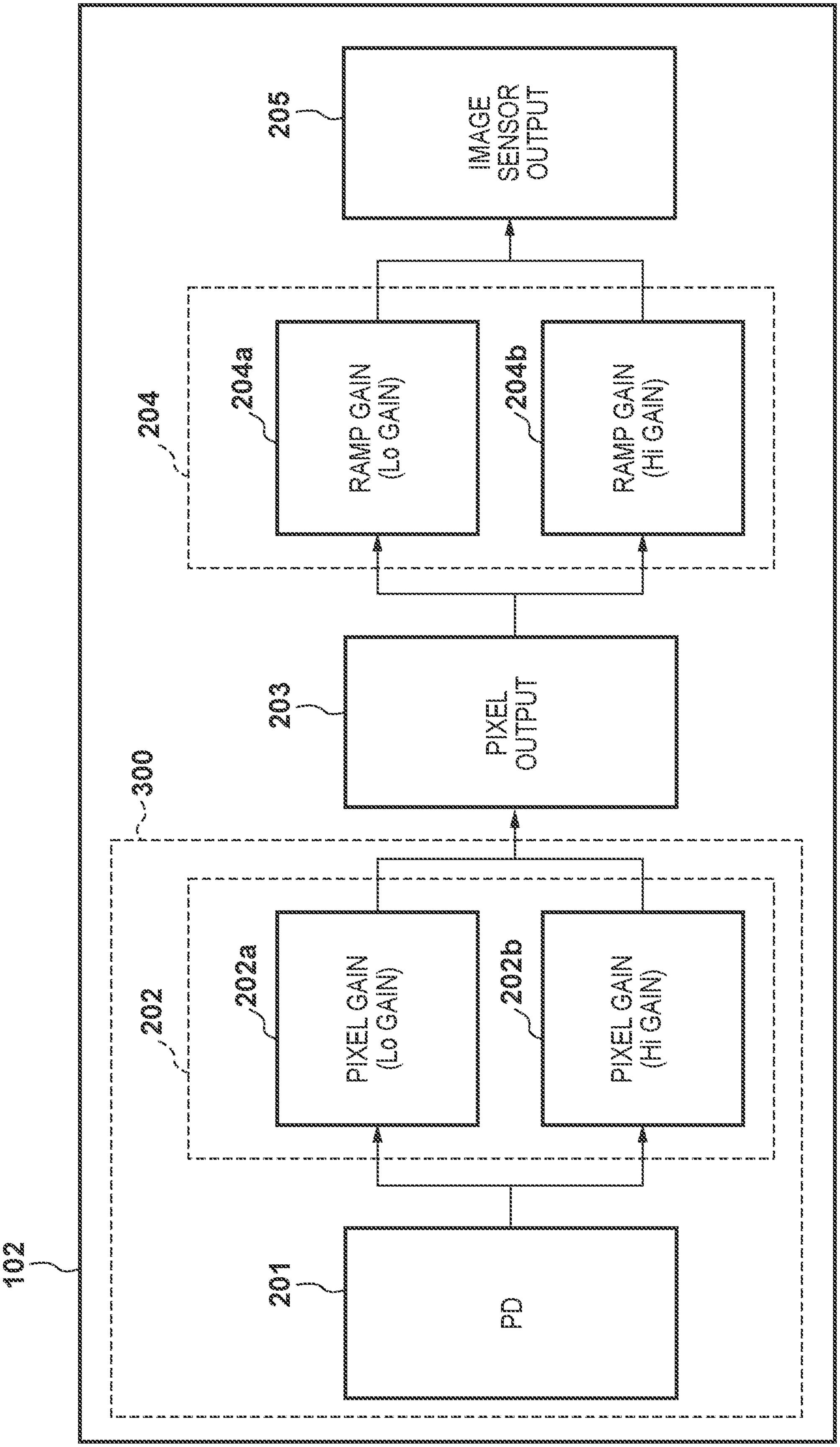
FIG. 2 is a block diagram showing a schematic configuration of an image sensor according to the first embodiment.

2. FIG. 2 is a block diagram showing a schematic configuration of the image sensor 102.

In FIG. 2, charges accumulated in a photodiode 201 (hereinafter, PD) are amplified in a pixel gain unit 202, which is composed of a floating diffusion unit (hereinafter, FD unit), and output as a pixel output 203, which is a voltage signal. The pixel gain unit 202 includes a pixel gain unit (Lo gain) 202*a* that performs amplification using a Lo gain (low gain), and a pixel gain unit (Hi gain) 202*b* that performs amplification using a Hi gain (high gain).

Note that regarding the pixel output 203, an N signal representing a reset cancelation signal for a pixel, and an S signal representing a light accumulation signal for the pixel, are read out in this order. In a case where the readout is performed after the pixel gain unit 202 has performed amplification using the two gains, namely the Hi gain and the Lo gain, an N signal and an S signal that have been amplified under the Hi gain, and an N signal and an S signal that have been amplified under the Lo gain, are read out in this order. Therefore, in a case where the pixel gain unit 202 performs amplification using two gains, the time period required to read out the pixel output 203 becomes long.

Next, an analog gain unit 204 inside the image sensor 102 applies gains to the pixel output 203. In the present embodiment, the analog gain unit 204 is a circuit that performs amplification using a ramp circuit, and includes a ramp gain unit (Lo gain) 204*a* and a ramp gain unit (Hi gain) 204*b*. Then, the signals to which at least one of the Lo gain (low gain) and the Hi gain (high gain) are output as an image sensor output 205.

It has been known that noise occurs in each circuit from the PD 201 to the image sensor output 205 as characteristics of a general image sensor. Furthermore, as a result of application of gains to a pixel signal in the amplification circuits, noise is amplified as well. For this reason, noise can be suppressed by performing amplification using a high gain in an earlier stage, and using a reduced gain in a later stage.

Therefore, in the first embodiment shown in FIG. 2, amplifying a pixel signal in the pixel gain units 202 is more advantageous than amplifying the same in the ramp gain units 204 in terms of pixel noise.

As the amplification circuits have their respective characteristics as described above, in the present embodiment, the system control unit 107 performs control to switch between the amplification circuits in accordance with a shooting mode or settings at the time of shooting of the image capturing apparatus 100.

For example, in the case of a high-speed continuous shooting mode, as it is necessary to prioritize the frame rate at the time of shooting, amplification in the analog gain unit 204, which enables a pixel signal to be read out at a higher speed, is selected.

Meanwhile, in a case where a high frame rate is not required as in long-exposure shooting, in which the accumulation time period at the time of shooting is longer than a predetermined time period, amplification in the pixel gain unit 202 is selected.

In addition, in a case where a mechanical shutter is used as a shutter method, the pixel gain unit 202 is selected as so-called rolling distortion does not occur.

Figure 3:
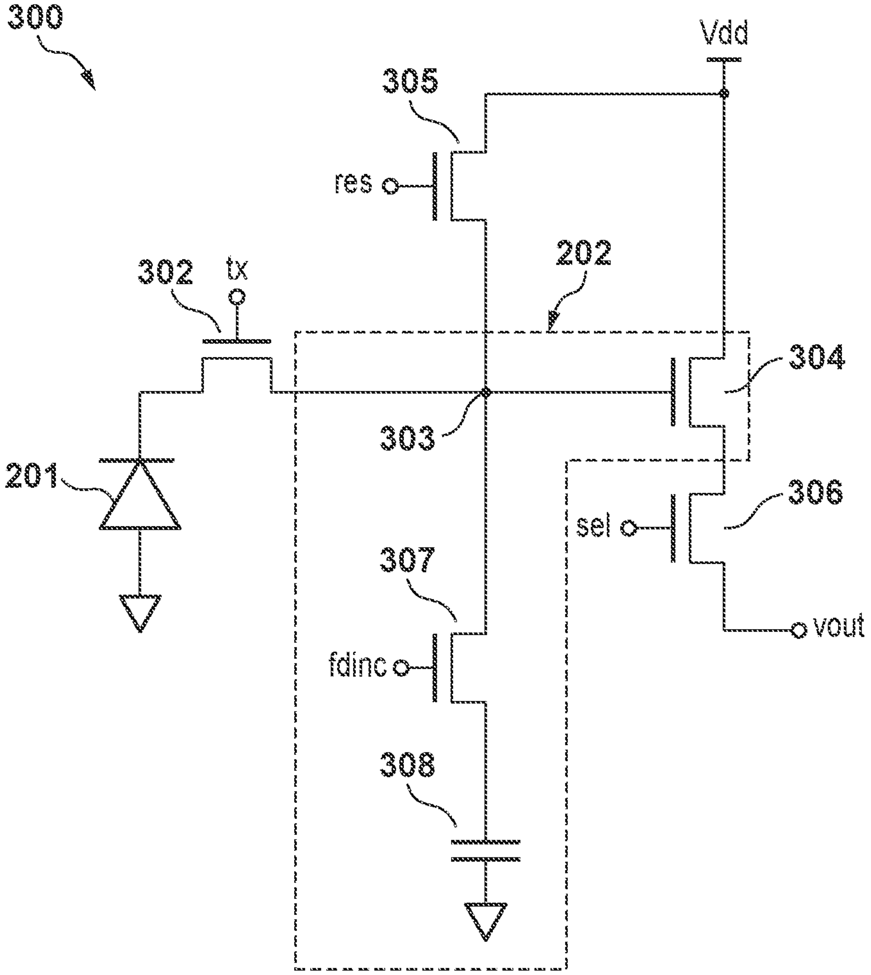
FIG. 3 is a diagram showing a configuration of a pixel in the image sensor.

Next, a description is given of the gain switching method in the pixel gain unit 202. FIG. 3 is a diagram showing a configuration of a pixel 300 in the image sensor 102.

In FIG. 3, the PD 201 performs photoelectric conversion with respect to incident light, and accumulates charges corresponding to the amount of incident light. When the level of a driving signal tx is High level, a transfer switch 302 transfers the charges accumulated in the PD 201 to an FD unit 303. The FD unit 303 is connected to a gate of a transistor that composes an FD amplifier 304. The FD amplifier 304 converts the amount of charges transferred from the PD 201 to the FD unit 303 into a voltage value.

A reset switch 305 is a switch element for resetting the FD unit 303, and resets the FD unit 303 when the level of a driving signal res is High level. Furthermore, when the levels of the driving signal tx and the driving signal res are simultaneously set at High level, both of the transfer switch 302 and the reset switch 305 are turned ON, and the PD 201 is reset via the FD unit 303.

When the level of a driving signal fdinc is High level, an FDinc switch 307 is turned ON and causes an additional capacity 308 to be connected to the FD unit 303. Furthermore, when the level of the driving signal fdinc is Low level, the FDinc switch 307 is turned OFF, and the additional capacity 308 and the FD unit 303 are placed in an unconnected state. As a result, the capacitance of the FD unit 303 changes. In other words, the FDinc switch 307 and the additional capacity 308 function as capacity changing means that makes a capacitance value of an input node variable.

By turning the FDinc switch 307 ON or OFF, the conversion ratio of the output voltage of the FD amplifier 304 to the charges transferred to the FD unit 303, that is to say, an FD conversion gain (hereinafter referred to as an FD gain) can be switched. In a connected state where the additional capacity 308 is connected to the FD unit 303, the electrostatic capacitance value increases, and the FD conversion gain becomes relatively small compared to the case of the unconnected state. This state is equivalent to the pixel gain unit (Lo gain) 202*a* illustrated in FIG. 2.

Conversely, when the additional capacity 308 and the FD unit 303 are placed in the unconnected state, the electrostatic capacitance value decreases, and the FD conversion gain becomes relatively large compared to the connected state. This state is equivalent to the pixel gain unit (Hi gain) 202*b* illustrated in FIG. 2. As described above, the image capturing apparatus 100 of the present embodiment can make the amount of charges held in the FD unit 303 variable in accordance with the driving signal fdinc, and switch the FD conversion gain of pixels 300 (an analog amplification function). Therefore, a plurality of types of analog gains can be output.

Figure 4:
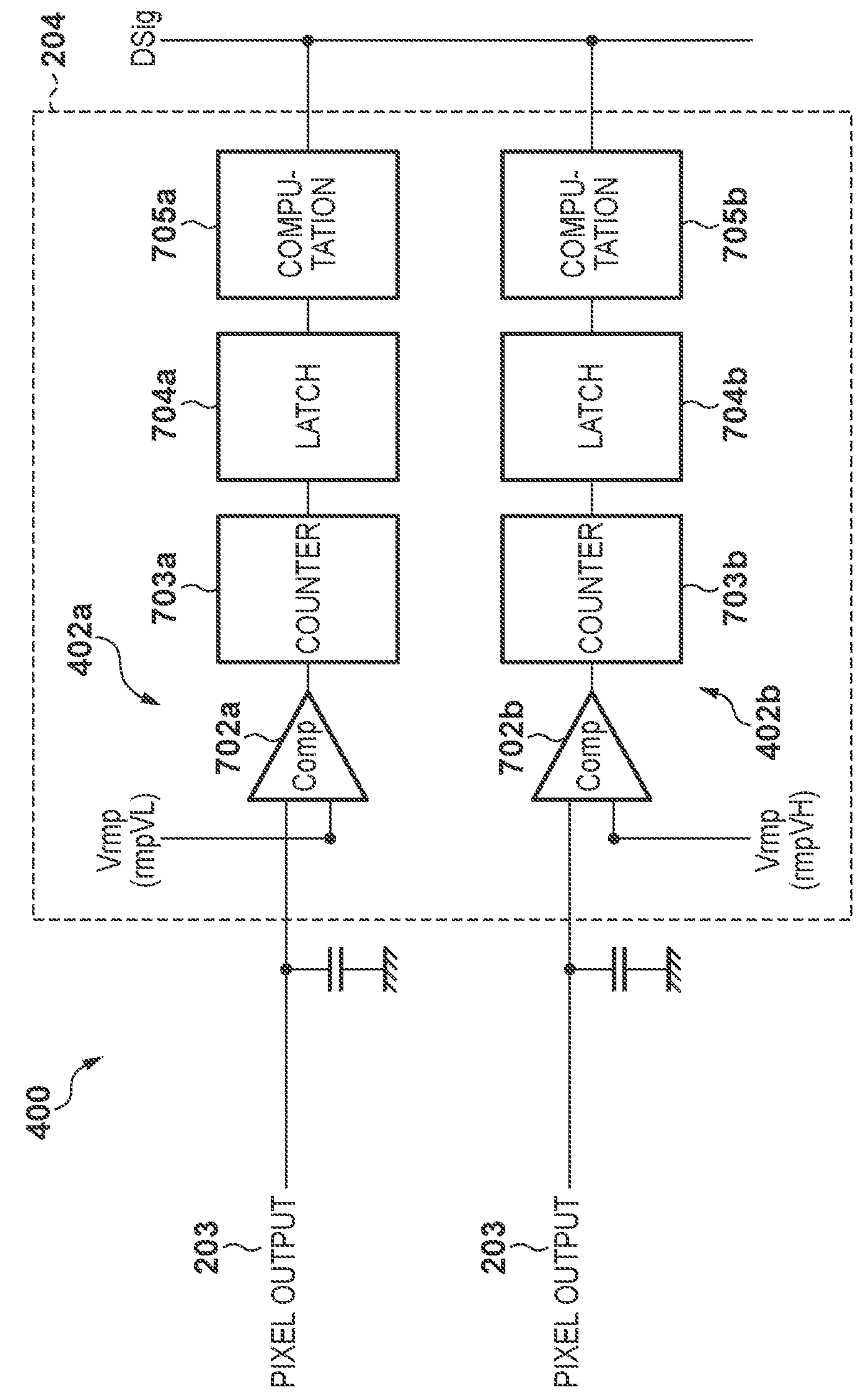
FIG. 4 is a diagram showing a configuration of an AD conversion unit in a column circuit of the image sensor.

Next, a description is given of a method of applying two types of gains in the ramp gain units 204. FIG. 4 is a diagram showing a configuration of an AD conversion unit 400 in a column circuit provided in each pixel column of the image sensor 102.

In FIG. 4, an AD converter 402*a* includes a comparator 702*a*, a counter circuit 703*a*, a latch circuit 704*a*, and a computation circuit 705*a*. Similarly, an AD converter 402*b* includes a comparator 702*b*, a counter circuit 703*b*, a latch circuit 704*b*, and a computation circuit 705*b*.

The comparators 702*a* and 702*b* are comparators which include two inputs connected to a ramp signal line Vrmp and a pixel output 203, and which output a comparison result. For example, a comparison result is output as a result of an output signal changing from High to Low when the magnitude relationship between the two input signals has reversed.

Here, a ramp signal rmp (a reference signal) input to the ramp signal line Vrmp is a triangle wave that gradually changes from an initial voltage. Then, the comparators 702*a* and 702*b* output a comparison result when the ramp signal that has gradually changed intersects with the pixel signal 203 output from a pixel.

The counter circuits 703_a_ and 703_b_ are connected to a non-illustrated counter control line, and cause a counter to operate based on a clock supplied from the counter control line. At this time, the counter circuits 703_a_ and 703_b_ start a count operation in conformity with the start of the ramp signal, and output count values at the time of reception of signals of the comparison results from the comparators 702_a_ and 702_b_. These count values are signals representing the digitalized pixel output 203.

The latch circuits 704_a_ and 704_b_ are connected to a non-illustrated latch control line, temporarily hold the count values output from the counter circuits 703_a_ and 703_b_, and output the count values held therein by way of control via the latch control line.

The computation circuits 705_a_ and 705_b_ are connected to a non-illustrated computation control line, and store the count values output from the latch circuits 704_a_ and 704_b_ as digital values of the pixel signal by way of control via the computation control line. Furthermore, the computation circuits 705_a_ and 705_b_ output the stored digital signals of the pixel to a digital output line DSig by way of control via a non-illustrated selection line.

Assume that, for example, both of the pixel signal 203 output from the pixel and the two types of ramp signals rmpVL and rmpVH with different inclinations, which are shown in FIG. 5, are input to the AD converters 402_a_ and 402_b_ configured in the above-described manner. It is assumed here that the ramp signal rmpVL is input to the AD converter 402_a_, and the ramp signal rmpVH is input to the AD converter 402_b_.

In this case, as the count values corresponding to the points of intersection between the pixel signal 203 and the ramp signals rmpVL and rmpVH are used as the digital values, the digital values are values that differ in accordance with the inclinations of the ramp signals rmpVL and rmpVH, like the count values D1 and D2.

A smaller inclination of a ramp signal yields a larger count value, whereas a larger inclination of a ramp signal yields a smaller count value. That is to say, changing the inclination of a ramp signal allows the AD conversion gain to vary. Due to the aforementioned principle, the ramp gain units 204 can change the AD conversion gain with respect to the pixel signal 203.

As described above, according to the aforementioned embodiment, selecting an amplification circuit to be used in accordance with a shooting mode or settings at the time of shooting makes it possible to provide a high-quality image capturing apparatus in which the balance between the readout speed and the image quality has been optimized while taking advantage of the characteristics of the respective amplification circuits.

Second Embodiment

Figure 6:
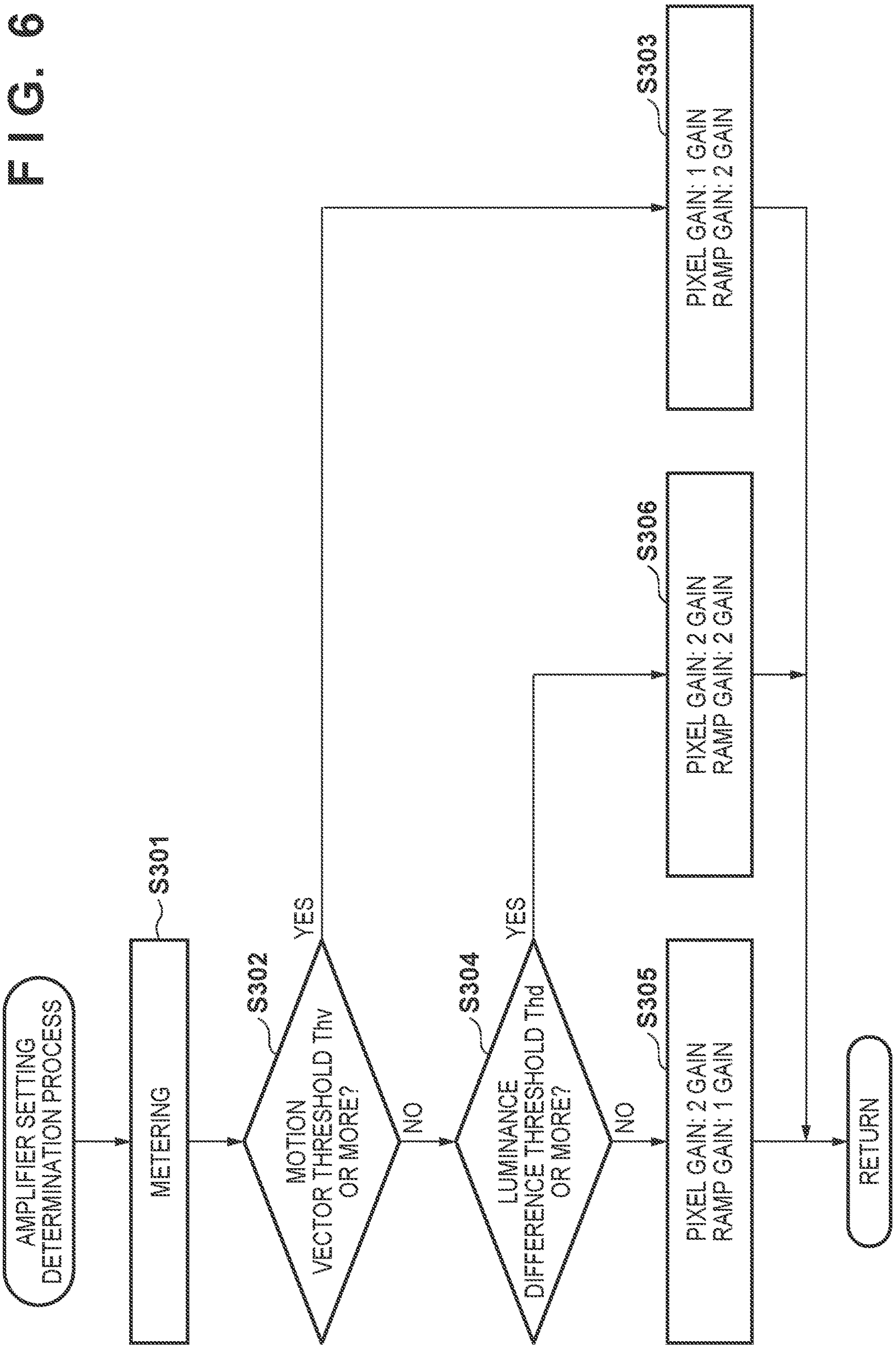
FIG. 6 is a flowchart showing processing for setting gains in a second embodiment.

Next, a second embodiment of the present invention will be described with reference to FIG. 6.

A block configuration of the image capturing apparatus 100 of the second embodiment is the same as that of FIG. 1 described in the first embodiment. The image capturing apparatus 100 of the second embodiment can amplify a pixel signal using an amplification circuit that is appropriate for shooting conditions at that time by switching between two types of amplifiers, namely the pixel gain units and the ramp gain units, based on determination of a shooting scene. The following only describes a method of switching between the amplification circuits based on determination of a shooting scene, which is different from the first embodiment.

Note that this processing is started when the non-illustrated release button included in the operation unit 110 has issued an instruction for shooting an HDR image. Furthermore, this processing is executed by the system control unit 107 deploying the program stored in the ROM 115 to the RAM 116 and executing the program.

In step S301, the system control unit 107 performs shooting under the exposure that has been determined in advance before main shooting, obtains an image signal output from the image sensor 102 using the image obtainment unit 103, and performs metering. The image signal obtained at this time may be read out from every pixel in the image sensor 102, or may be read out through readout based on thinning, or readout based on binning; the image signal is output after being amplified under a gain that has been determined in advance. Furthermore, in order to detect a motion of a subject as will be described later, an image signal is read out repeatedly at a predetermined interval.

In step S302, the system control unit 107 uses the motion detection unit 107_b_ to calculate a motion vector component of the subject between image data that was used in metering in step S301 and image data that was obtained therebefore. Then, it determines whether the motion vector component (detection result) is equal to or larger than a threshold Thy that has been determined in advance.

If the motion vector component is equal to or larger than the threshold Thv, the system control unit 107 determines that the subject is in motion, and processing proceeds to step S303. On the other hand, if the motion vector component is smaller than the threshold Thv, it is determined that the subject is not in motion, and processing proceeds to step S304.

In step S304, the system control unit 107 receives the result of metering performed in step S301 from the image obtainment unit 103, and calculates a luminance difference between a bright portion area and a dark portion area of the subject using the luminance difference detection unit 107_a_. Then, it determines whether the calculated luminance difference (the contrast detection result) is equal to or larger than a threshold Thd that has been determined in advance.

The system control unit 107 causes processing to proceed to step S305 in a case where the calculated luminance difference is smaller than the threshold Thd (the luminance difference is small), and causes processing to proceed to step S306 in a case where the calculated luminance difference is equal to or larger than the threshold Thd (the luminance difference is large).

Step S303, S305, and S306 are steps for setting gains in the system control unit 107. Based on this gain setting, the system control unit 107 transmits a control signal to the image sensor control unit 108.

In step S303, as there is a concern that the subject in motion causes rolling distortion, the system control unit 107 performs control to amplify a pixel signal using two gains, namely Hi gain and Lo gain, as ramp gains so that the signal readout speed is further accelerated.

In step S305, the system control unit 107 performs control to amplify a pixel signal using two gains, namely Hi gain and Lo gain, as pixel gains so that a shot image has less noise and high image quality.

In step S306, the system control unit 107 performs control to amplify a pixel signal using two gains, namely Hi gain and Lo gain, as both of pixel gains and ramp gains. In this case, a shot image with higher image quality and a wider dynamic range can be generated by configuring a setting whereby a pixel signal is amplified mainly using pixel gains, which are more advantageous in terms of noise, and the deficiency is compensated for by using ramp gains.

Note that the above embodiments have been described using an example in which two images that differ in brightness are obtained by amplifying an image signal obtained through a single shooting session using two types of gains, and an HDR image is generated by compositing these two images. However, the gains used in amplifying a pixel signal is not limited to two types, and the amplification may be performed using three or more types of gains.

Furthermore, the present invention is applicable to a variety of image capturing apparatuses as long as they are image capturing apparatuses that can perform composition with an enhanced dynamic range by setting different gains.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-179092, filed Nov. 8, 2022, which is hereby incorporated by reference herein in its entirety.

What is claimed is:

1. An image capturing apparatus, comprising:

a plurality of pixels that generate signals through photoelectric conversion;

a first amplifier capable of amplifying a signal of each pixel among the plurality of pixels using a first plurality of different gains;

a second amplifier capable of amplifying the signal of each pixel among the plurality of pixels using a second plurality of different gains, with a method different from a method used by the first amplifier, the second amplifier being arranged in a stage that follows the first amplifier; and at least one processor or circuit configured to function as a control unit that performs control so as to execute one of first processing and second processing based on a shooting mode of the image capturing apparatus, a setting at the time of shooting, or a state of a subject, the first processing causing the first amplifier to amplify the signal of each pixel among the plurality of pixels using the first plurality of different gains, the second processing causing the second amplifier to amplify the signal of each pixel among the plurality of pixels using the second plurality of different gains, wherein the control unit controls so as to execute the second processing without executing the first processing by the first amplifier in a case where the subject is in motion.

2. The image capturing apparatus according to claim 1, wherein the control unit performs control so as to execute one of the first processing, the second processing, and third processing based on the shooting mode of the image capturing apparatus, the setting at the time of shooting, or the state of the subject, the third processing causing the first amplifier to amplify the signal of each pixel among the plurality of pixels using the first plurality of different gains, and also causing the second amplifier to amplify the signal of each pixel among the plurality of pixels using the second plurality of different gains.

3. The image capturing apparatus according to claim 2, wherein the control unit performs control so as to execute one of the first processing and the third processing based on a detection result from a contrast detection sensor that detects contrast of the subject.

4. The image capturing apparatus according to claim 1, wherein the first amplifier is arranged in each pixel among the plurality of pixels.

5. The image capturing apparatus according to claim 1, wherein the first amplifier amplifies the signal of each pixel among the plurality of pixels using different gains by switching circuits that are arranged in the corresponding pixel.

6. The image capturing apparatus according to claim 5, wherein the first amplifier switches between gains by switching between a state where an additional capacity to be connected to a floating diffusion unit in each one of the plurality of pixels is connected to the floating diffusion unit, and a state where the additional capacity is disconnected from the floating diffusion unit.

7. The image capturing apparatus according to claim 1, wherein the second amplifier is arranged in a column circuit in a stage that follows the first amplifier.

8. The image capturing apparatus according to claim 7, wherein the second amplifier causes the gains used in amplifying the signal of each pixel among the plurality of pixels to differ by causing different ramp signals to be input to an AD converter.

9. The image capturing apparatus according to claim 8, wherein the second amplifier causes the gains used in amplifying the signal of each pixel among the plurality of pixels to differ by causing ramp signals with different inclinations to be input to the AD converter.

10. The image capturing apparatus according to claim 1, wherein the control unit performs control so as to execute the second processing in a case of a continuous shooting mode.

11. The image capturing apparatus according to claim 1, wherein the control unit performs control so as to execute the first processing in a case where an accumulation time period at the time of shooting is longer than a predetermined time period.

12. The image capturing apparatus according to claim 1, wherein the control unit performs control so as to execute the first processing in a case where a mechanical shutter is used.

13. The image capturing apparatus according to claim 1, wherein the at least one processor or circuit is configured to function as a composition unit that composites a plurality of signals which have been amplified by the first amplifier and the second amplifier and which have different gains.

14. The image capturing apparatus according to claim 13, wherein the composition unit composites the plurality of signals which have been amplified by the first amplifier and the second amplifier and which have different gains, so as to increase a dynamic range.

15. A method for controlling an image capturing apparatus including a plurality of pixels that generate signals through photoelectric conversion, a first amplifier capable of amplifying a signal of each pixel among the plurality of pixels using a first plurality of different gains, and a second amplifier capable of amplifying the signal of each pixel among the plurality of pixels using a second plurality of different gains, with a method different from a method used by the first amplifier, the second amplifier being arranged in a stage that follows the first amplifier, the method comprising:

performing control so as to execute one of first processing and second processing based on a shooting mode of the image capturing apparatus, a setting at the time of shooting, or a state of a subject, the first processing being capable of causing the first amplifier to amplify the signal of each pixel among the plurality of pixels using the first plurality of different gains, the second processing causing the second amplifier to amplify the signal of each pixel among the plurality of pixels using the second plurality of different gains, wherein in the performing control, the control is performed so as to execute the second processing without executing the first processing by the first amplifier in a case where the subject is in motion.

* * * * *